J. MORZINSKI.
ROWBOAT.
APPLICATION FILED OCT. 30, 1907.
906,261.
Patented Dec. 8, 1908.
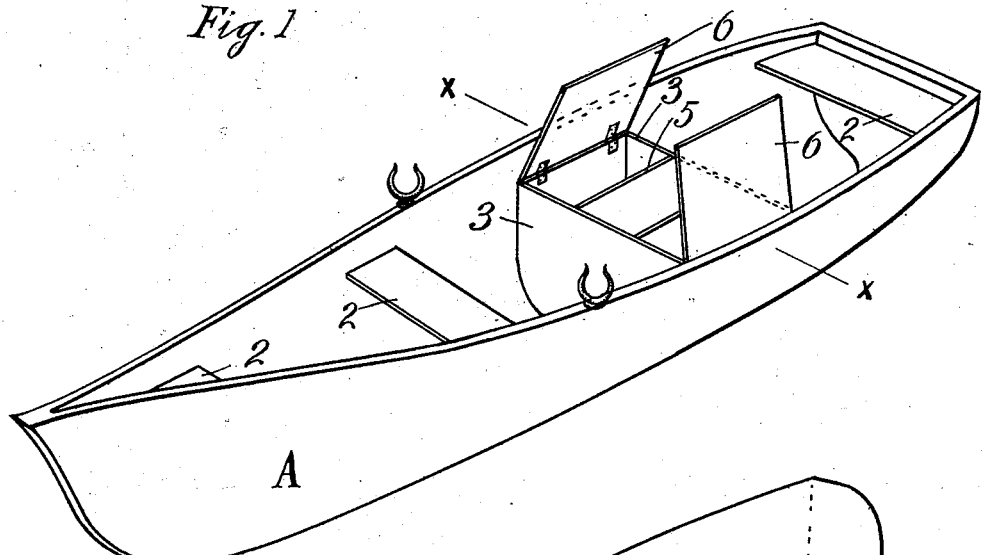
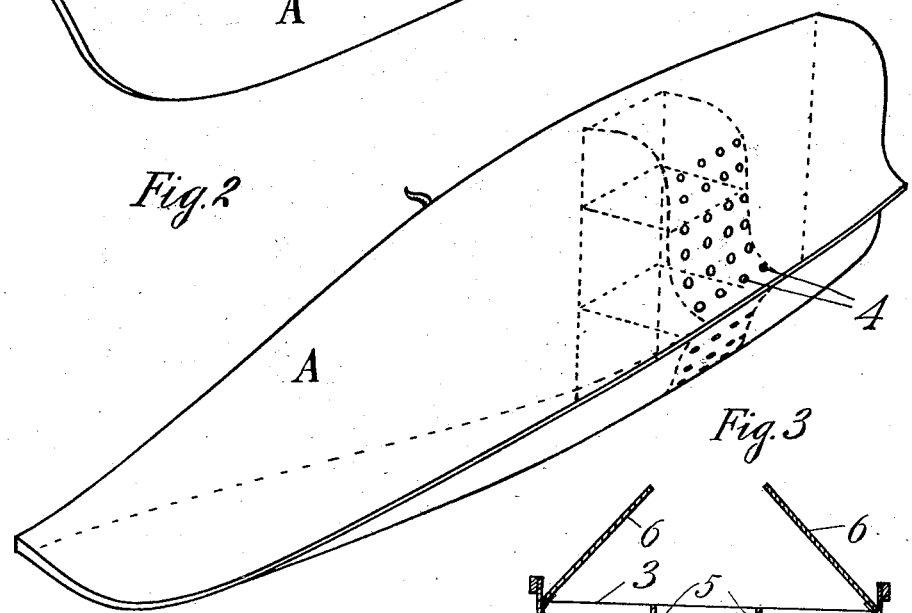
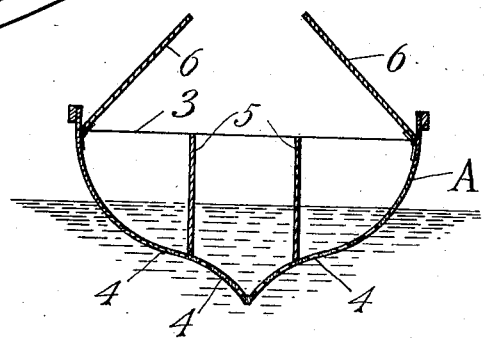
Witnesses,
George Voelker
Hattie Smith
Inventor,
John Morzinski
by Lothrop & Johnson
his Attorneys.

UNITED STATES PATENT OFFICE.

JOHN MORZINSKI, OF ST. PAUL, MINNESOTA.

ROWBOAT.

No. 906,261.   Specification of Letters Patent.   Patented Dec. 8, 1908.

Application filed October 30, 1907. Serial No. 399,794.

*To all whom it may concern:*

Be it known that I, JOHN MORZINSKI, a citizen of the United States, residing at St. Paul, in the county of Ramsey and State of Minnesota, have invented certain new and useful Improvements in Rowboats, of which the following is a specification.

My invention relates to improvements in rowboats its object being to provide a receptacle in connection with a rowboat for storing fish, said receptacle opening through the boat below the water line so as to be kept supplied with water from outside the boat, and being so constructed and arranged as not to interfere with the rowing qualities of the boat.

To this end my invention consists in the features of construction and combination hereinafter particularly described and claimed.

In the accompanying drawings forming part of this specification, Figure 1 is a perspective view of a boat embodying my improvements, Fig. 2 is a perspective view of the boat turned on its side, and Fig. 3 is a section on line $x$—$x$ of Fig. 1.

Referring to the drawings A represents a row boat of ordinary construction shown provided with the usual seats 2. 3 represents parallel transverse vertical partitions constituting an intermediate receptacle or fish box, which is preferably located at or adjacent to the center or amidships of the boat, whereby the boat is properly balanced and its equilibrium preserved. The bottom of the boat intermediate of the walls 3 is formed with a plurality of openings 4 below the water line whereby when the boat is in use the water will circulate from outside the boat through the receptacle. The fish receptacle may be provided with dividing partitions 5 and suitable covers 6. While I have shown two walls 3 I may, of course, use a greater number thus increasing the number of fish holding receptacles.

It will be evident that by means of my features of invention I secure a fish box in connection with an ordinary row boat which box will contain a constant supply of fresh water without letting any water get into the body of the boat, and without impeding the movement of the boat through the water.

I claim:

A boat of the class described having a portion of its bottom provided with a plurality of openings located below the water line, said openings affording constant circulation for the water within the portion of the boat wherein said openings are formed, a pair of partitions extending transversely and approximately amidships of the boat and arranged at the edges of the perforated portion to form a compartment within the boat about said openings and thereby confine the water entering through said openings, a plurality of partitions arranged between said transverse partitions and extending longitudinally of the boat, whereby said compartment is sub-divided into a series of fish-holding compartments, and a cover for said compartments.

In testimony whereof I affix my signature in presence of two witnesses.

JOHN MORZINSKI.

Witnesses:
   H. S. JOHNSON,
   HATTIE SMITH.